United States Patent
Almodovar Herraiz et al.

(10) Patent No.: US 8,521,197 B2
(45) Date of Patent: Aug. 27, 2013

(54) INCLUDING INFORMATION IN A MESSAGE

(75) Inventors: Daniel Almodovar Herraiz, Madrid (ES); Javier Montaner Gutierrez, Madrid (ES); Jose Luis Cantarero Rodriguez, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 164 days.

(21) Appl. No.: 12/625,128

(22) Filed: Nov. 24, 2009

(65) Prior Publication Data

US 2010/0261489 A1   Oct. 14, 2010

(30) Foreign Application Priority Data

Nov. 26, 2008   (ES) .................................. 200803369

(51) Int. Cl.
*H04W 4/14*   (2009.01)
(52) U.S. Cl.
USPC .......................................... 455/466; 455/418
(58) Field of Classification Search
USPC .................... 455/466, 412.1, 414.1, 418, 445, 455/456
See application file for complete search history.

(56) References Cited

U.S. PATENT DOCUMENTS

| 7,277,713 | B2  |    | 10/2007 | Landschaft et al. |
|-----------|-----|----|---------|-------------------|
| 7,986,944 | B2  | *  | 7/2011  | Rhyu ........................ 455/414.1 |
| 8,014,757 | B1  | *  | 9/2011  | Lim ........................... 455/412.1 |
| 2005/0186969 | A1 |  | 8/2005 | Lohtia |
| 2007/0173268 | A1 | * | 7/2007 | Le Bodic et al. ............. 455/466 |
| 2008/0119200 | A1 |  | 5/2008 | McConnell |
| 2009/0061833 | A1 | * | 3/2009 | Ho et al. .................... 455/414.2 |
| 2012/0238299 | A1 | * | 9/2012 | Myllynen et al. ............. 455/466 |

FOREIGN PATENT DOCUMENTS

| WO | WO-03/071825 |   | 8/2003 |
| WO | WO 03/071825 | * | 8/2012 |

* cited by examiner

*Primary Examiner* — Kamran Afshar
*Assistant Examiner* — Khawar Iqbal
(74) *Attorney, Agent, or Firm* — B. Aaron Schulman, Esq.; Nicholas B Trenkle, Esq.; Stites & Harbison, PLLC

(57) ABSTRACT

A method and system are described for including information in a message (200) between an originating and a destination communication terminal. In order to automatically include dynamic information in the message (200) the user may insert one or more predetermined codes (230) in the message body (260). Each of the codes (230) consists of one or more symbols and specifies the information to be included in the message. The specified information is retrieved for example from external servers available on the Internet and is included in the message body.

14 Claims, 4 Drawing Sheets

INCLUDING INFORMATION IN A MESSAGE

BACKGROUND OF THE INVENTION

1. Technical Field

The present invention relates to a method and system for including information in a message between an originating communication terminal and a destination. The present invention relates more particularly to a method and system for including information in a SMS (Short Message Service) or MMS (Multimedia Message Service) message.

2. Description of Related Art

There is no easy automated way of sending context information of a mobile phone user such as the user's location or the temperature at the user's location, to one or several further mobile phone users by means of SMS. If a user wishes to share such information with others he has to insert this information manually in the SMS message. An example of a situation wherein it would be desirable to send such a message, is the case that a user is late for a meeting/date and would like to send a message to his friend indicating his position. In this way, the friend can estimate how much time the user will need to get to the meeting point. An example of such a message is "I am at Strand with Bedford" or "I am around 700 meters from you".

In current mobile phones, the information contained in the header of the short message (mainly sender number, receiver number and sending and receiving times) is displayed separately from the message body that comprises the actual message. Including the user's context information in the short message header would have two main drawbacks. The first drawback is that due to the limited available space in the message header too little additional information can be attached in this way. The second drawback is that this information is not displayed together with the body of the SMS text message at the receiving terminal, so it cannot be seen at first glance by the receiving user.

Furthermore, as already indicated, in case that the user wishes to include the context information (e.g. location, temperature) in the body of the message, this context information must be obtained in a separate process, different from the writing of the message. For example, in case of sending his position, the user has to obtain his position for example by finding street plates, using GPS or Google Maps and then write it manually as text within the body of the short message.

EP 1 091 607 A2 discloses a method and apparatus for providing hypermedia content maintained remotely on a network to a wireless device without a browser. A Short Message Service request for Internet-based content is received from a wireless device on a wireless network at a proxy server via an SMS Centre (SMS-C). The proxy server transcodes the SMS request from a character set of the SMS-C to a character set of an application and extracts a keyword from the transcoded request. The proxy server looks up the extracted keyword in a keyword-to-URL mapping to identify the URL of an application associated with the keyword and constructs an HTTP POST operation containing the keyword and the URL which is submitted to the application over a wireline network such as the Internet. The proxy server extracts the requested content from a received HTTP response from the application in response to the POST operation, and then translates the content from the content-type used by the application to the content-type used by the SMS-C and transcodes the content from the character set used by the application to the character set used by the SMS-C. The translated and transcoded content is then sent as an SMS response to the SMS-C, for subsequent delivery to wireless device as an SMS message. So, according to this disclosure the originating communication terminal receives an answer with the requested information from the SMS-C.

SUMMARY OF THE INVENTION

It is an object of the invention to provide a method and a system enabling a user to specify information, in particular context information of the user, to be automatically included in the body of a message transmitted by the user in addition to the information that traditionally is present in the message body.

Thereto, according to the invention a method and system according to the independent claims are provided. Favourable embodiments are defined in dependent claims.

According to an aspect of the invention, a method is provided for including information in a message between an originating communication terminal and a destination. The message body of the message may comprise one or more predetermined codes. Each of the codes consists of one or more symbols and specifies information to be inserted in the message body. If the message body comprises such codes, the information specified by each of the one or more predetermined codes is retrieved and inserted in the message body. According to a preferred embodiment, the information is text that is inserted in the message at the place and in lieu of the code to which it corresponds. The remaining text of the message body is maintained. The method is in principle usable for any type of communication messages but it is particularly useful for SMS and MMS messages.

In case that the information is dynamic information, such as context information of the user of the originating terminal, for example the user's actual location or the actual weather at the user's location, this information may be retrieved from an external server, which for example is available on the Internet.

The method may be executed by an application installed in a cellular communication network, for example an SMS centre, or by an application installed in the originating mobile terminal. As a result, the message receiver receives a message with a normal plain text body comprising the information that the sender wanted to share.

Alternatively, the method may be performed by an application installed in the receiving terminal.

According to an embodiment of the invention, it is determined if the message body comprises a further predetermined code indicating that the message body includes one or more of the predetermined codes specifying information to be inserted in the message body. If this is the case, the message is intercepted. Otherwise, the message is forwarded to its destination without amending it. As a result, it may be decided if a message should be intercepted for including the information in a simple and reliable way. Preferably, the further predetermined code is included at the beginning of the message body.

According to a further embodiment of the invention, a part of the predetermined codes specifying information to be inserted in the message body is indicative of the way of retrieval and or display of the information specified by the predetermined code. It may for example indicate the URL to be used to retrieve the specified information. Alternatively, or additionally it comprises a part that indicates a parameter of the information specified by the predetermined code, which should be included in the message body. Examples of such parameters are the temperature or the humidity in case that the information is the weather, or the absolute location, relative location or the location indicated by street names in case that the information is the user's location. As a result the user is enabled to specify more precisely, how the information is to be retrieved and/or displayed.

Preferably, the method according to the invention is implemented by means of a computer program.

According to a further aspect of the invention there is provided a system for including information in a message between an originating communication terminal and a destination comprising:

retrieving means for, if a message body comprises one or more predetermined codes, each of the codes consisting of one or more symbols and specifying information to be inserted in the message body, retrieving the information specified by each of the one or more predetermined codes; and inserting means for inserting the information in the message body.

According to an embodiment of the invention the system is part of a cellular communication network.

According to an alternative embodiment of the invention the system is part of a mobile terminal.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
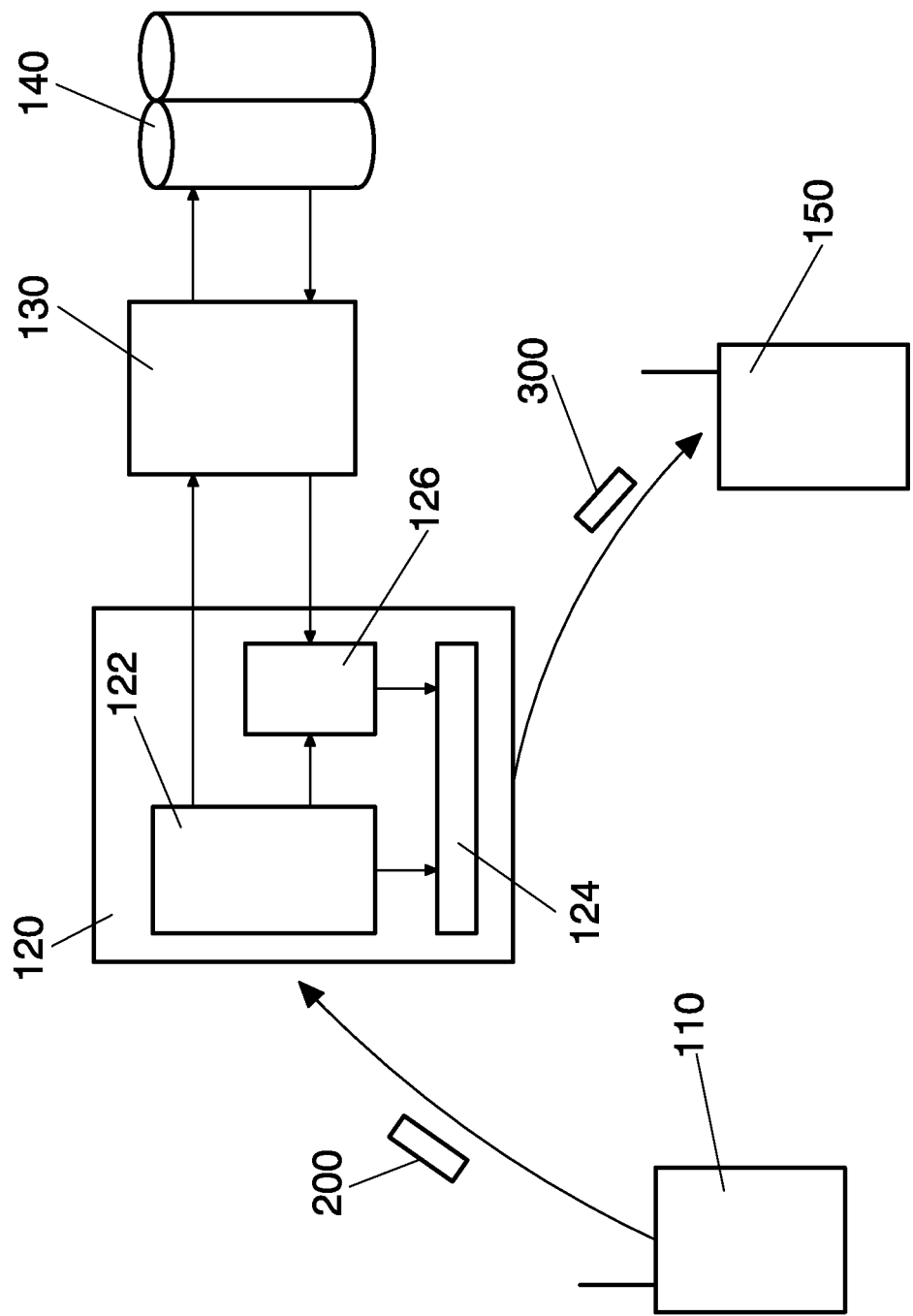
FIG. 1 shows a block diagram of a first embodiment of the system according to the present invention.

Referring now to FIG. 1, a first embodiment of the system according to the present invention will be described. The figure shows an originating mobile terminal 110 sending an SMS message 200, an SMS centre (SMS-C) 120 and a receiving mobile terminal receiving an amended SMS message 300.

Figure 2:
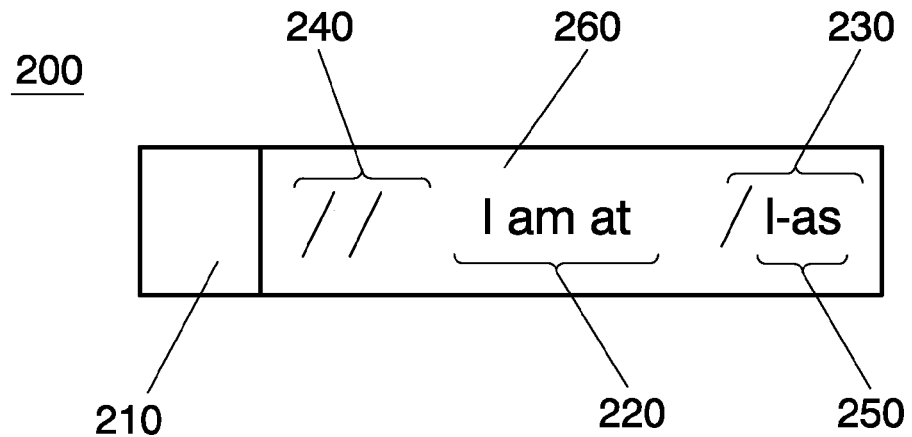
FIG. 2 shows an example of a message comprising a code specifying information to be inserted.

The SMS message 200 is shown in detail in FIG. 2. It comprises a message header 210 and a message body 260. The message body comprises plain text 220 and a predetermined code 230 specifying dynamic information to be inserted in the SMS message. The message body furthermore comprises a further predetermined code 240 at the beginning of the message body 260 indicating that the message body 260 includes one or more predetermined codes 230. The predetermined code 230 comprises a part 250 indicative of the way of retrieval and/or display of the information specified by the predetermined code. It may for example indicate the URL to be used for retrieving the specified information, such as the web server from a location service provider, or the URL to be used for displaying the position as a mark on a street/satellite map in the mobile device screen. Alternatively or additionally, part 250 indicates a parameter of the information specified by the predetermined code, which should be included in the message body.

Now an example is given of suitable codes that may be used for implementing the present invention. As predetermined codes 230 special symbols and letters may be used as in many programming languages.

The code for specifying that the sender's location should be included in the message is for example /l. The part 250 indicating the way of retrieval of the information specified by the predetermined code and/or indicating the parameter of the information specified by the predetermined code, which should be included in the message body is for example:

-a: absolute location
-r: relative location to destination (distance)
-s: use street names
-u: use URL to Google Maps or similar Further examples of possible predetermined codes 230, possibly having one or more parts 250 indicating the way of retrieval of the information and/or the parameter to be included, are:

/w: replace by weather in sender's location
-t: temperature
-h: humidity
/t: include latest twitter message So, according to the examples shown herein above, the predetermined codes 230 always start with the symbol "/" and the part(s) 250 with the symbol "-". Of course, the skilled person would realise that there are many other possibilities of defining the predetermined codes 230.

As further predetermined code 240, which indicates that the message body 260 includes predetermined codes 230, the code "//" may be used.

The SMS-C 120 comprises intercepting means 122, routing means 124 and inserting means 126. The intercepting means 122 are adapted for determining if an SMS message received by the SMS-C comprises a further predetermined code 240 or not. If the SMS message does not comprise such a further predetermined code 240, it is routed to its destination by the routing means 124 as is well known in the art. If the SMS message comprises a further predetermined code 240, it is intercepted. The intercepting means 122 send the one or more predetermined codes 230 to retrieving means 130 and forward the message 200 to the inserting means 126. The retrieving means 130 may be part of the SMS-C or located outside the SMS-C, as shown in FIG. 1. The retrieving means 130 are adapted for interpreting the predetermined codes 230, including the parts 250 thereof that indicate the way of retrieval and/or display of the information specified by the predetermined code and/or a parameter of the information specified by the predetermined code, which should be included in the message body. Based on this interpretation, the retrieving means 130 request the information specified by the predetermined codes from one or more external servers 140 available on the Internet or on the mobile operator's network. The external servers may be generally known servers providing added value services such as providing a requesting entity with location or weather information.

Figure 3:
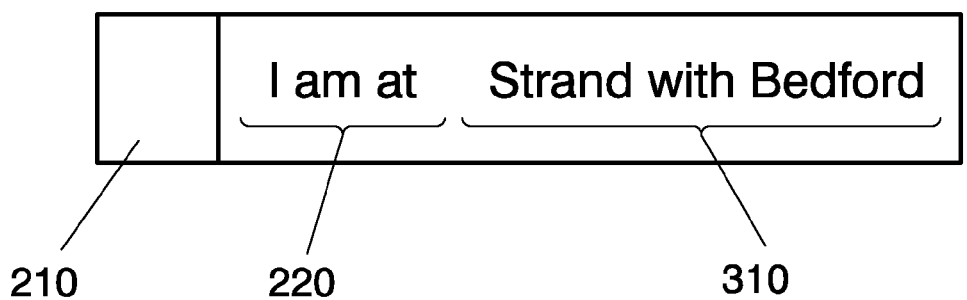
FIG. 3 shows an example of the message with the inserted information.

The external servers 140 provide the retrieving means 130 with the requested information. In case that the information is in a format suitable to be directly inserted into an SMS message, i.e. it is a text of a limited length, the retrieving means 130 may forward the information directly to the inserting means 126. The inserting means 126 replace the predetermined code 230 of the SMS message 200 by the retrieved information 310. The original text 220 is maintained at its original location. This results in an amended SMS message 300 having a message body 260 comprising plain text, as is shown in FIG. 3. The routing means 124 route SMS message 300 to its destination, as is known per se.

However, generally the retrieving means will have to adapt the format of the information retrieved from the servers. This will for example be necessary in case that the information is not in the form of text, it is text but too long to be inserted in an SMS message, or if the retrieved information has to be adapted to include the parameter to be inserted specified by one or more parts 250 of the predetermined code 230. In these cases, the retrieving means adapt the retrieved information to the required format. This may include calculations, for example for converting a retrieved absolute location of the user to a relative location with respect to the destination terminal 150 of the call.

The intercepting means 122, inserting means 126 and retrieving means 130 may be implemented as computer programs.

As is shown in the example of FIGS. 2 and 3, the predetermined code 230 of the original message 200 specifies that the user's location should be included. The parts 250 thereof specify that the parameters to be included should be the absolute location and that street names should be used to indicate the user's location. As a result, the amended message 300 comprises the user's absolute location indicated by street names.

Some further examples of possible messages generated by means of the exemplary codes listed herein above are:
Originating message 200: "I am at /l -r". Amended message 300: "I am around 700 meters from you".
Originating message 200: "Hi Guys, let's go to the beach! It is /w-t today". Amended message 300: "Hi Guys, let's go to the beach! It is 28° today".

The predetermined codes may also be used to restrict the delivery of the SMS message to conditions at the receiver side. For example, the message is only delivered when the destination terminal is within 1000 meters of the location of the originating terminal.

Figure 4:
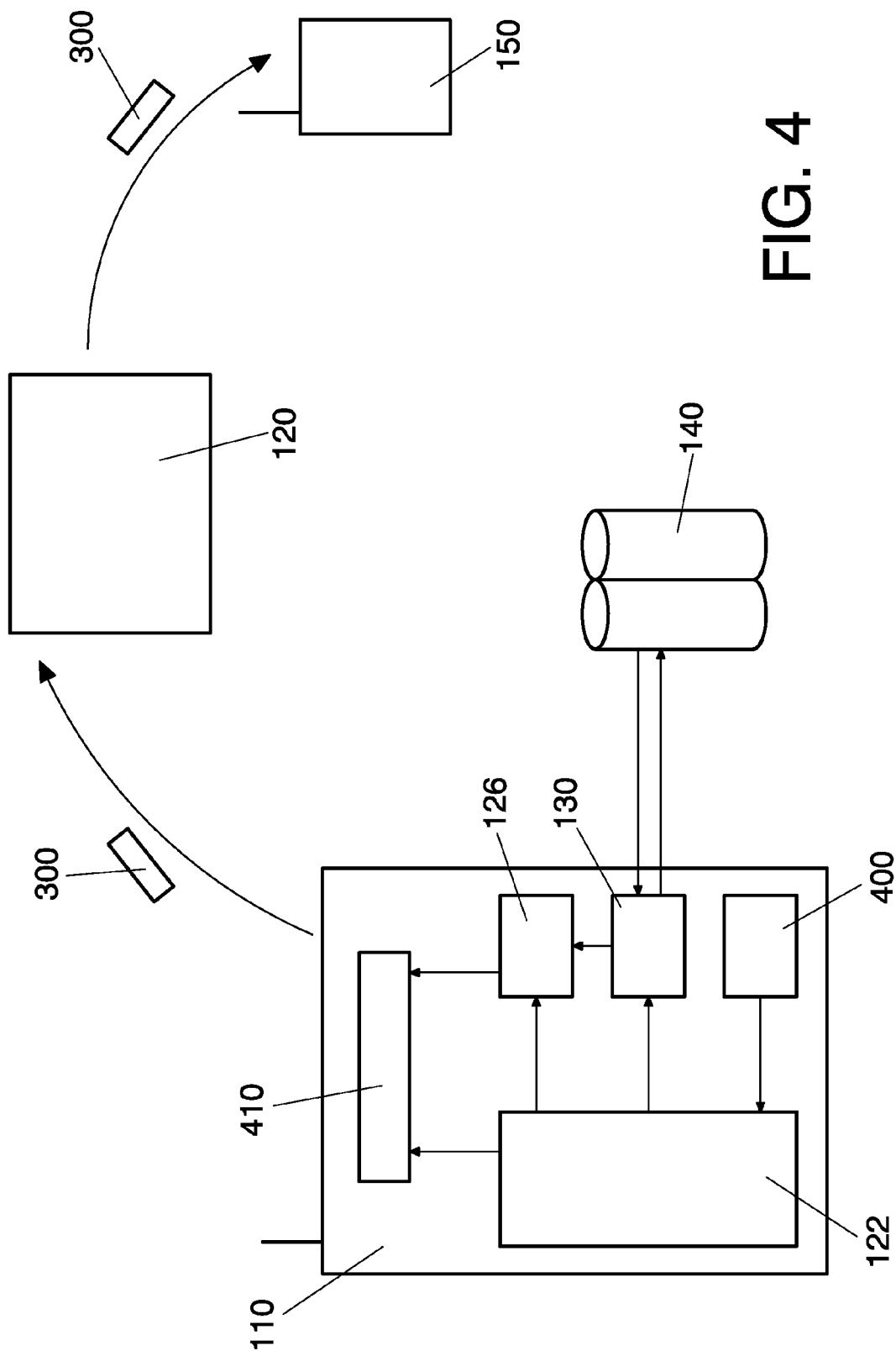
FIG. 4 shows a block diagram of a second embodiment of the system according to the present invention.

As is shown in FIG. 4, according to a second embodiment of the system according to the present invention, the originating mobile terminal 110 may comprise all functionality needed for including dynamic information in an SMS message, i.e. it comprises the intercepting means 122, retrieving means 130 and inserting means 126. The terminal 110 comprises a user interface 400 for generating an originating SMS message 200. The user interface may be a graphical interface enabling the user to generate the predetermined codes 230 by selecting corresponding templates. The originating message 200 is then provided to the intercepting means 122, which determine if the message 200 comprise a further predetermined code 240 or not. If the SMS message does not comprise such a further predetermined code 240, it is forwarded to SMS transmitting means 410 for transmission, as is well known in the art. If the SMS message comprises a further predetermined code 240, it is intercepted. The intercepting means 122 send the one or more predetermined codes 230 present in the message body 260 to the retrieving means 130 and forward the message 200 to the inserting means 126. The retrieving means 130 retrieve the information specified by the predetermined codes 230 from external servers 140 and provide it to the inserting means 126. The inserting means insert the information into the SMS message, which results in the amended SMS message 300. This message 300 is transmitted by the SMS transmitting means 410.

Figure 5:
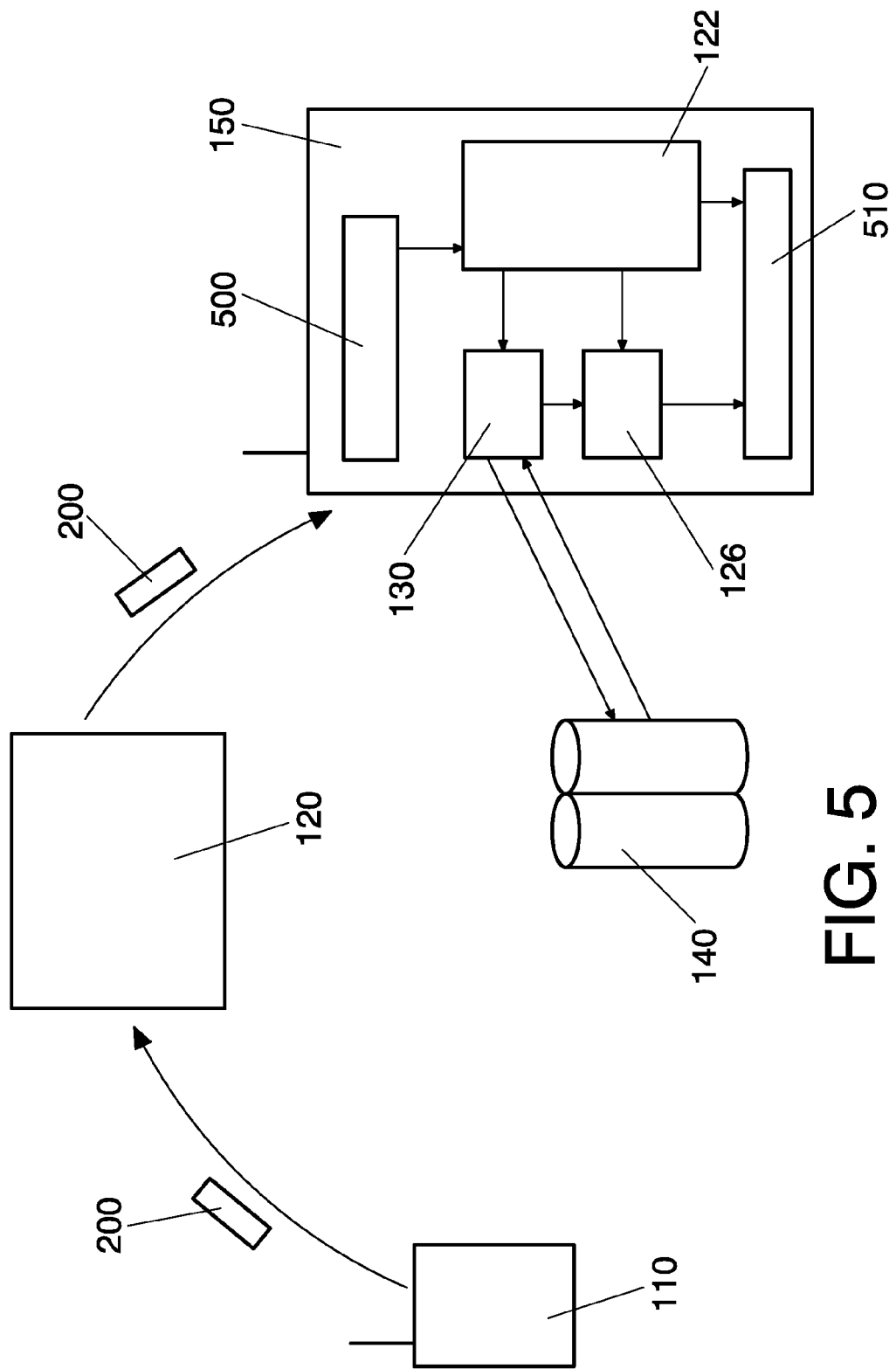
FIG. 5 shows a block diagram of a third embodiment of the system according to the present invention.

As is shown in FIG. 5, according to a third embodiment of the system according to the present invention, the destination mobile terminal 150 may comprise all functionality needed for including dynamic information in an SMS message, i.e. it comprises the intercepting means 122, retrieving means 130 and inserting means 126. The terminal 150 comprises SMS receiving means 500 for receiving an incoming SMS message 200. The originating message 200 is then provided to the intercepting means 122, which determine if the message 200 comprise a further predetermined code 240 or not. If the SMS message does not comprise such a further predetermined code 240, it is stored in a memory 510 for later display, as is well known in the art. If the SMS message comprises a further predetermined code 240, it is intercepted. The intercepting means 122 send one or more predetermined codes 230 present in the message body 260 to the retrieving means 130 and forward the message 200 to the inserting means 126. The retrieving means 130 retrieve the information specified by the predetermined codes 230 from external servers 140 and provide it to the inserting means 126. The inserting means insert the information into the SMS message, which results in the amended SMS message 300. This message 300 is stored in the memory 510 for later display.

In any of the embodiments, when the information to be introduced in the message corresponds to the user's context information (e.g. location, weather), the present invention is not constrained to consider only the originating user's context but also the destination user's context as long as the information can be obtained. There could be technical and privacy restrictions for this latter case. In any case, it is acknowledged that the originating user's context information will be the most likely to be introduced in almost all cases, since the destination user's context information is generally known by the destination user already.

While the invention has been illustrated and described in detail in the drawings and foregoing description, such illustration and description are to be considered illustrative or exemplary and not restrictive; the invention is not limited to the disclosed embodiments.

For example, the invention is applicable to other types of messages than SMS, such as MMS (Multimedia Message Service) messages. Furthermore, the invention is not only applicable to location and weather information as described in the preferred embodiments but for any type of static and dynamic information.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for automatically including information in communications transmitted between terminals over a network, the method comprising:
analyzing a message that is being transmitted from an originating communication terminal to a destination terminal and that includes a message header, which has a sender field having a value specifying the originating communication terminal as a sender of the message and a receiver field having a value specifying the destination terminal as a destination of the message, and a message body, which includes content of the message, to determine whether the message body of the message includes one of one or more predetermined codes that each comprises a first part having one or more characters indicating that information should be inserted into the message body and a second part specifying the information to be inserted into the message body that is indicated by the one or more characters of the first part;

upon a determination that the message body includes one of the one or more predetermined codes, retrieving the information as specified by the second part of the predetermined code included in the message body;

upon retrieval of the information specified by the second part of the predetermined code included in the message body, inserting the information into the message body; and forwarding the message to the destination terminal specified as the destination of the message by the receiver field of the message header.

2. A method according to claim 1, wherein the information specified by the second part of the predetermined code included in the message body is text.

3. A method according to claim 1, wherein inserting the information into the message body comprises replacing the predetermined code included in the message body with the information.

4. A method according to claim 1, further comprising:
determining whether the message body includes a predetermined indicator code indicating that the message body includes at least one of the one or more of the predetermined codes; and
upon a determination that the message body includes the predetermined indicator code, intercepting the message.

5. A method according to claim 1, further comprising determining whether the predetermined code included in the message body comprises a third part indicative of at least one of:
a manner of retrieval and/or display of the information specified by the second part of the predetermined code included in the message body; and
a parameter of the information, specified by the second part of the predetermined code of the predetermined code included in the message body that specifies a detail of the information to be inserted into the message body.

6. A computer program product comprising computer program code adapted to perform the method of claim 1, when said computer program code is run on a computer.

7. Computer program product as claimed in claim 6 embodied on a computer readable medium.

8. A system for automatically including information in communications transmitted between terminals over a network, the system comprising:
a retrieving unit that analyzes a message that is being transmitted from an originating communication terminal to a destination terminal and that includes a message header, which has a sender field having a value specifying the originating communication terminal as a sender of the message and a receiver field having a value specifying the destination terminal as a destination of the message, and a message body, which includes content of the message, to determine whether the message body of the message includes one of one or more predetermined codes that each comprises a first part having one or more characters indicating that information should be inserted into the message body and second part specifying the information to be inserted into the message body that is indicated by the one or more characters of the first part and, upon determining that the message body includes one of the one or more predetermined codes, retrieving the information as specified by the second part of the predetermined code included in the message body;
an insertion unit that, upon the retrieving unit retrieving the information specified by the second part of the predetermined code included in the message body, inserts the information into the message body; and
a router for forwarding the message to the destination terminal specified as the destination of the message by the receiver field of the message header.

9. A system according to claim 8, wherein the information specified by the second part of the predetermined code included in the message body is text.

10. A system according to claim 8, wherein the insertion unit is adapted for replacing the predetermined code included in the message body with the information specified by the second part of the predetermined code.

11. A system according to claim 8, further comprising:
a message interceptor adapted for determining whether the message body includes a predetermined indicator code indicating that the message body includes at least one of the one or more of the predetermined codes, and, upon determining that the message body includes the predetermined indicator code, intercepting the message.

12. A system according to claim 8, wherein of the retrieving unit further determines whether the predetermined code included in the message body comprises a third part indicative of at least one of:
a manner of retrieval and/or display of the information specified by the second part of the predetermined code included in the message body; and
a parameter of the information specified by the second part of the predetermined code of the predetermined code included in the message body that specifies a detail of the information to be inserted into the message body.

13. A cellular communication network incorporating a system according to claim 8.

14. A mobile terminal incorporating a system according to claim 8.

* * * * *